United States Patent
Sundaresan et al.

(10) Patent No.: US 10,275,553 B2
(45) Date of Patent: Apr. 30, 2019

(54) CUSTOM CIRCUIT POWER ANALYSIS

(71) Applicant: Oracle International Corporation, Redwood Shores, CA (US)

(72) Inventors: Krishnan Sundaresan, Sunnyvale, CA (US); Aravind Oommen, San Jose, CA (US); Mohd Jamil Mohd, Santa Clara, CA (US); Hemanga Lal Das, Fremont, CA (US); Pranjal Srivastava, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 208 days.

(21) Appl. No.: 14/155,608

(22) Filed: Jan. 15, 2014

(65) Prior Publication Data

US 2015/0199460 A1 Jul. 16, 2015

(51) Int. Cl.
*G06F 17/50* (2006.01)
(52) U.S. Cl.
CPC ...... *G06F 17/5022* (2013.01); *G06F 2217/78* (2013.01)
(58) Field of Classification Search
CPC .............. H01L 28/20; H01L 21/02595; H01L 21/02532; H01L 22/20; H01L 22/14
USPC ......................................................... 716/134
See application file for complete search history.

(56) References Cited

U.S. PATENT DOCUMENTS

| | | | | |
|---|---|---|---|---|
| 5,481,469 A * | 1/1996 | Brasen | ........... | G01R 31/318357 702/60 |
| 5,673,420 A * | 9/1997 | Reyes | ................. | G06F 17/5022 703/13 |
| 6,212,665 B1 * | 4/2001 | Zarkesh | .............. | G06F 17/5022 703/14 |
| 6,338,025 B1 * | 1/2002 | Bowen | ................ | G06F 17/5022 702/117 |
| 2012/0131523 A1 * | 5/2012 | Lu | ........................ | G06F 17/5022 716/102 |
| 2012/0192163 A1 * | 7/2012 | Glendenning | ...... | G06F 17/5045 717/143 |
| 2012/0249230 A1 * | 10/2012 | Sugiyama | ........... | G06F 17/5022 327/564 |
| 2015/0331983 A1 * | 11/2015 | Kalte | .................. | G06F 17/5054 716/103 |

* cited by examiner

*Primary Examiner* — Jack Chiang
*Assistant Examiner* — Brandon Bowers
(74) *Attorney, Agent, or Firm* — Ferguson Braswell Fraser Kubasta PC (57) ABSTRACT

A method for simulating a power consumption associated with a circuit. Once a netlist describing the circuit and an input stimulus for the netlist are obtained, the netlist is partitioned into multiple circuit blocks. Circuit logic models (CLMs) implemented in a hardware description language (HDL) are then obtained for the multiple circuit blocks and a logic netlist is generated from the multiple CLMs. A power vector for a CLM corresponding to a circuit block is calculated using a logic simulator inputting the logic netlist and the input stimulus. Further, a power consumption value is calculated for the circuit block using a circuit simulator and the power vector. The power consumption associated with the circuit is calculated based on the power consumption values for various circuit blocks.

20 Claims, 5 Drawing Sheets

CUSTOM CIRCUIT POWER ANALYSIS

BACKGROUND

Due to increasing transistor densities in modern microchips and growing demand for mobile electronic devices, which have limited battery storage, power consumption has become an important parameter in designing microprocessors and other integrated circuits. Simulating power consumption requires choosing input stimuli (e.g., test case input voltages varying with time) that resemble circuit operation and performing a simulation of a circuit netlist (e.g., textual representation of a circuit) using the input stimuli. Individual circuit blocks may contain a few million transistors and require hundreds of input stimuli for a comprehensive simulation. However, current power simulation methods, such as flat-mode simulation using modern circuit simulators, are computationally expensive and are only feasible for circuits with a few hundred devices or a small set of input stimuli.

SUMMARY

In general, in one aspect, the invention relates to a method for simulating a power consumption associated with a circuit. The method comprises: obtaining a netlist describing the circuit and an input stimulus for the netlist; partitioning the netlist into a plurality of circuit blocks; obtaining a plurality of circuit logic models (CLMs) implemented in a hardware description language (HDL) for the plurality of circuit blocks; generating a logic netlist from the plurality of CLMs implemented in the HDL; calculating, using a logic simulator inputting the logic netlist and the input stimulus, a power vector for a CLM corresponding to a first circuit block; calculating, using a circuit simulator and the power vector, a first power consumption value for the first circuit block; and calculating the power consumption associated with the circuit based on the first power consumption value.

In general, in one aspect, the invention relates to a system for simulating a power consumption associated with a circuit. The system comprises: a hardware processor; a circuit partitioner executing on the hardware processor and configured to: obtain a netlist describing the circuit; and partition the netlist into a plurality of circuit blocks; a logic model generator executing on the hardware processor and configured to: obtain a plurality of circuit logic models (CLMs) implemented in a hardware description language (HDL) for the plurality of circuit blocks; and generate a logic netlist from the plurality of CLMs implemented in the HDL; a logic simulator executing on the hardware processor and configured to: obtain an input stimulus for the netlist; and calculate, using the logic netlist and the input stimulus, a power vector for a CLM corresponding to a first circuit block of the plurality of circuit blocks; a circuit simulator executing on the hardware processor and configured to: calculate, using the power vector, a first power consumption value for the first circuit block; and a power roll-up module executing on the hardware processor and configured to: calculate the power consumption associated with the circuit based on the first power consumption value.

In general, in one aspect, the invention relates to a non-transitory computer readable medium (CRM) storing instructions for simulating a power consumption associated with a circuit. The instructions comprise functionality for: obtaining a netlist describing the circuit and an input stimulus for the netlist; partitioning the netlist into a plurality of circuit blocks; obtaining a plurality of circuit logic models (CLMs) implemented in a hardware description language (HDL) for the plurality of circuit blocks; generating a logic netlist from the plurality of CLMs implemented in the HDL; calculating, using a logic simulator inputting the logic netlist and the input stimulus, a power vector for a CLM corresponding to a first circuit block of the plurality of circuit blocks; calculating, using a circuit simulator and the power vector, a first power consumption value for the first circuit block; and calculating the power consumption associated with the circuit based on the first power consumption value.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and a system for simulating a power consumption associated with a circuit. More specifically, embodiments of the invention are directed to a divide-and-conquer approach of splitting up a circuit into smaller circuit blocks and performing circuit simulations on the smaller blocks. This process requires less computational resources than a single simulation of the entire circuit. Once the power consumption is calculated for the individual circuit blocks, it may be summed to obtain the power consumption for the entire circuit or for the desired portion(s) of the circuit.

Figure 1:
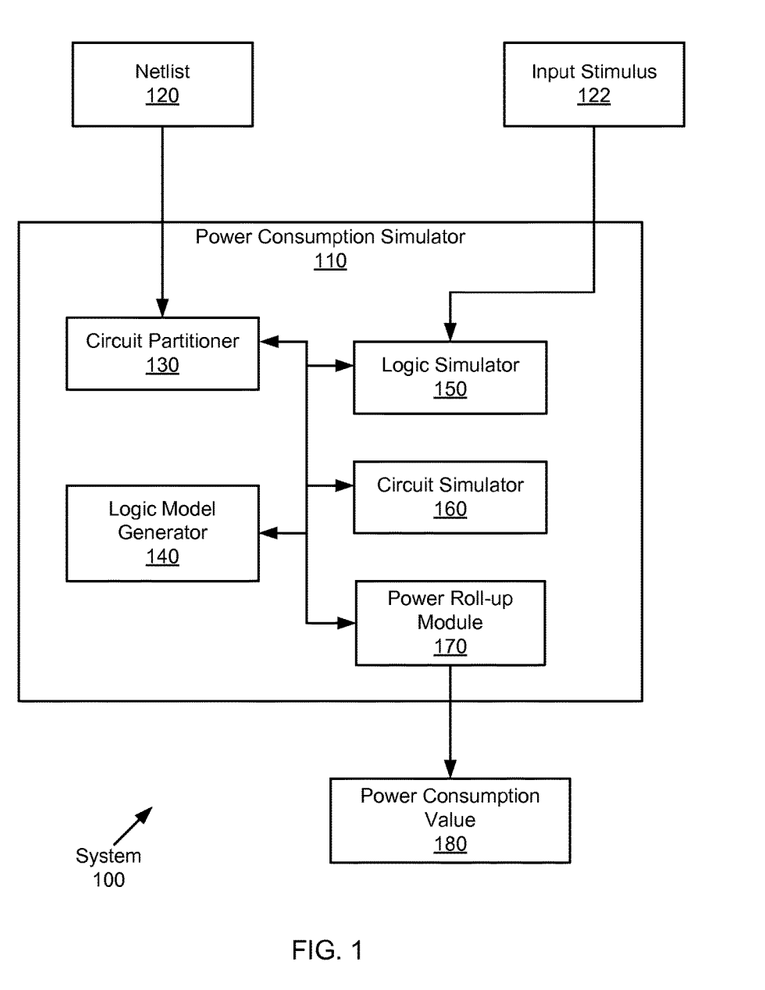
FIG. 1 shows a system in accordance with one or more embodiments of the invention.

FIG. 1 shows a system (100) in accordance with one or more embodiments of the invention. In FIG. 1, there exists a power consumption simulator (110) that inputs both a netlist (120) and an input stimulus, and that outputs a power consumption value (180). The power consumption simulator (110) may have multiple components including a circuit partitioner (130), a logic model generator (140), a logic simulator (150), a circuit simulator (160), and a power roll-up module (170). These components (130, 140, 150, 160, 170) may all execute on the same hardware device (e.g., personal computer, server, mainframe, tablet computer, laptop, smartphone, etc.) or may execute on different hardware devices connect by a network having wired and/or wireless segments.

In one or more embodiments of the invention, the netlist (120) is a representation of a circuit (e.g., one or more text files, one or more binary files, one or more schematics, one or more layouts, and other formats). The netlist (120) may contain a list of labels representing electrical components (e.g., resistors, capacitors, inductors, diodes, transistors, and other devices) and nodes that identify which components are connected together and how the components are connected. The netlist (120) is readable by the power consumption simulator (110) and represents sufficient detail to obtain power consumption data given the input stimulus (122). The netlist (120) may describe circuit components in flat format (e.g., a set of electrical components and nodes) and/or in hierarchical format (e.g., a set of modules).

In one or more embodiments of the invention, the input stimulus (122) is a representation of one or more stimuli (e.g., voltage change, current change, changes in other parameters) applied to one or more devices or nodes (e.g., inputs, outputs) of the netlist (120). The input stimulus (122) may contain one or more vectors, where each vector describes a change in a physical parameter (e.g., voltage, current) over a time period to a node or device in the netlist (120). Each vector may contain other parameters such as rise time, fall time, delay, frequency, etc. that affect power consumption of the netlist (120). Each parameter in the input stimulus (122) may be specified as a piecewise function or as a continuous function over a time window (e.g., several clock cycles of a microprocessor's clock). The input stimulus (122) may include other physical parameters such as temperature, drive impedance, magnetic fields, electromagnetic waves, stress vectors, and any other constant or varying parameters that affect the power consumption of the circuit. The input stimulus (122) may be specified in a text file, a binary file, a waveform, and any other representation and is readable by the power consumption simulator (110).

In one or more embodiments of the invention, the circuit partitioner (130) is a module that divides the netlist (120) into smaller sections referred to as circuit blocks. The number of circuit blocks may range from one (i.e., the netlist (120) is not divided at all) to millions (e.g., each digital gate or state-holding device is its own circuit block). The target number of circuit blocks resulting from the partitioning process may be set/selected based on the average time required to simulate a circuit block, the number of connections between circuit blocks, the area of each circuit block, the execution time of the partitioning process, and other parameters of interest. The circuit paritioner (130) may use any algorithm to partition the netlist (120) into circuit blocks. Example algorithms include the Kernighan-Lin algorithm, the Fiducia-Mattheyses algorithm, the Coldberg and Burstein algorithm, etc. The circuit partitioner (130) may also rely on the hierarchy in the design of the circuit and/or user input (e.g., a user selecting which parameters are weighted more in the circuit block optimization, how many devices on average per circuit block, or even specifying circuit block boundaries) to partition the circuit into circuit blocks. In one or more embodiments of the invention, the circuit blocks may correspond to channel-connected-blocks (CCBs) or channel-connected-components (CCCs). Circuit blocks may be also created in a hierarchical fashion (for example, a circuit block may be divided into several sub-circuit blocks, and sub-circuit blocks may be further divided into sub-sub-circuit blocks, etc.) in order to recursively apply the algorithm(s) discuss below in reference to FIG. 2 and FIG. 3. Those skilled in the art, having the benefit of this detailed description, will appreciate that circuit partitioning may aid in solving circuit parameters, such as power consumption, in a divide-and-conquer approach.

In one of more embodiments of the invention, in order to reduce the total number of circuit blocks to be processed by the power consumption simulator (110), the circuit partitioner (130) selects representative circuit blocks (not shown) to be analyzed. In other words, the circuit blocks resulting from the partitioning process may be grouped according to various criteria, and a representative circuit block is selected from the group for further analysis/simulation. For example, if there are hundreds of circuit blocks that include a flip-flop of the same size, fan-in, fan-out, drive strength, size ratio, then only one of these circuit blocks is chosen for additional analysis/simulation. In one or more embodiments of the invention, a single representative is used for circuit blocks having the same topology but different sizes, size-ratios, drive-strength, fan-in, and/or fan-out. In this case the representative circuit block may be parameterized to take into considerations the any differences/variances.

In one or more embodiments of the invention, the logic model generator (140) generates a circuit logic model (CLM) from a circuit block. The logic model generator (140) may receive all (or only the representative) circuit blocks created by the circuit partitioner (130) and generate un-parameterized and/or parameterized CLMs for the circuit blocks. A CLM may be represented as a truth table, a hardware design language (HDL) netlist, an Boolean equation, a binary decision diagram, switch-level diagram or any suitable data structure for storing functional information about a particular circuit block. Further, the CLM may be generated using any algorithm. CLM generation for different circuit blocks may use different algorithms and contain different types of CLMs depending on heuristics such as performance associated with CLM generation for a particular circuit block size or type. In one or more embodiments of the invention, the individual CLMs generated by the logic model generator (140) are stitched together to form a logic netlist (not shown) corresponding to the original netlist (120).

In one or more embodiments of the invention, the logic simulator (150) configured to simulate the behavior of a logic netlist (not shown) given the input stimulus (122). Those skilled in the art, having the benefit of this detailed description, will appreciate that many logic simulators exist (e.g., Verilog-XL, ModelSim, Synopsis VCS, Cadence NCSim, and others) and many representations of logic netlists exist (e.g., Verilog, VHDL and others) that can be utilized by the power consumption simulator (110). In one or more embodiments of the invention, the logic simulator (150) takes as input the logic netlist (not shown) generated by the logic model generator (140), and propagates switching activity from the input stimulus (122) to the circuit blocks, generating a set of power vectors for all circuit blocks. The power vectors may include constant or time-varying voltage and current signals at the inputs or outputs of each circuit block. In one or more embodiments of the invention, the power vectors also include state information (e.g., a set of logic voltage levels or current levels stored within the circuit block at one or more points of time). In one or more embodiments of the invention, power vectors store impedance values, drive strength values, temperature values, pressure values, and other physical parameters that may affect the power consumption of a circuit block(s).

In one or more embodiments of the invention, the circuit simulator (160) is configured to simulate the behavior of a circuit netlist (e.g., a circuit block). The circuit simulator (160) differs from the logic simulator (150) in that the circuit simulator (160) considers all electronic devices (e.g., individual transistors, resistors, capacitors) and internal nodes in the simulation whereas the logic simulator (150) generally concerns itself with a behavioral model (e.g., 0 or 1 levels) at the interfaces of logic models. The circuit simulator (160)

is configured to take a circuit block produced by the circuit partitioner (130) and the power vector(s) for the circuit block produced by logic simulator (150), and calculate a power consumption value of the circuit block for each power vector. The power consumption value may include a power model containing a power consumption metric for each vector and may be parameterized (e.g., for scaling the circuit block, changing a size ratio, fan-in, fan-out, and/or drive strength). The power consumption value for each circuit block may be stored in any appropriate format (e.g., floating point number, a table, a Synopsys .lib file). The circuit simulator (160), unlike the logic simulator (150), is configured to produce detailed power consumption information of a circuit block and hence may be slower. Consequently, the circuit simulator (160) is better suited for small circuit blocks (e.g., a few hundred devices or less) and a limited set of power vectors. Those skilled in the art, having the benefit of this detailed description, will appreciate that many circuit simulators exist (e.g., SPICE, HSPICE, SmartSPICE, etc.) that can be utilized in the circuit simulator (160).

In one or more embodiments of the invention, the power roll-up module (170) is configured to obtain power consumption values from the circuit blocks and generate a power consumption value (180) for the entire netlist (120) or a desired portion of the netlist (120), when excited with the input stimulus (122). The power roll-up module (170) may sum the power from all the circuit blocks to generate the power consumption value (180). In one or more embodiments of the invention, the power roll-up module (170) groups the circuit blocks into sections (e.g., physical sections of a chip, circuit blocks of a similar type) and reports the power consumption values of these sections. In another embodiment, the power roll-up module reports the power consumption of all circuit blocks or all representative circuit blocks in an organized format. Those skilled in the art, having the benefit of this detailed description, will appreciate that by providing the power consumption values of individual sections or circuit blocks, fine-grained analysis of power usage may be executed. This in turn may: (i) facilitate understanding and optimization of the power consumption of individual circuit blocks; and (ii) aid in reducing the power consumption of the entire circuit.

In one or more embodiments of the invention, the power consumption value (180) is the total power consumed by the netlist (120) with the given input stimulus (122). As discussed before, the power consumption value (180) may also be a table or any other data structure representing the power consumption value of individual circuit blocks or groups or circuit blocks (i.e., sections of the circuit), yielding fine-grained information about the power consumption of the circuit.

Those skilled in the art, having the benefit of this detailed description, will appreciate that the divide-and-conquer approach stated above is especially beneficial for circuit simulation since, in general, if a netlist is doubled in size, a simulation of said netlist takes more than twice as long to complete (i.e., the computational complexity is higher than linear). Consequently, by dividing the netlist into smaller circuit blocks and performing circuit simulations on those circuit blocks, the total time of the simulation may be substantially faster, in some cases several orders of magnitude faster.

Figure 2:
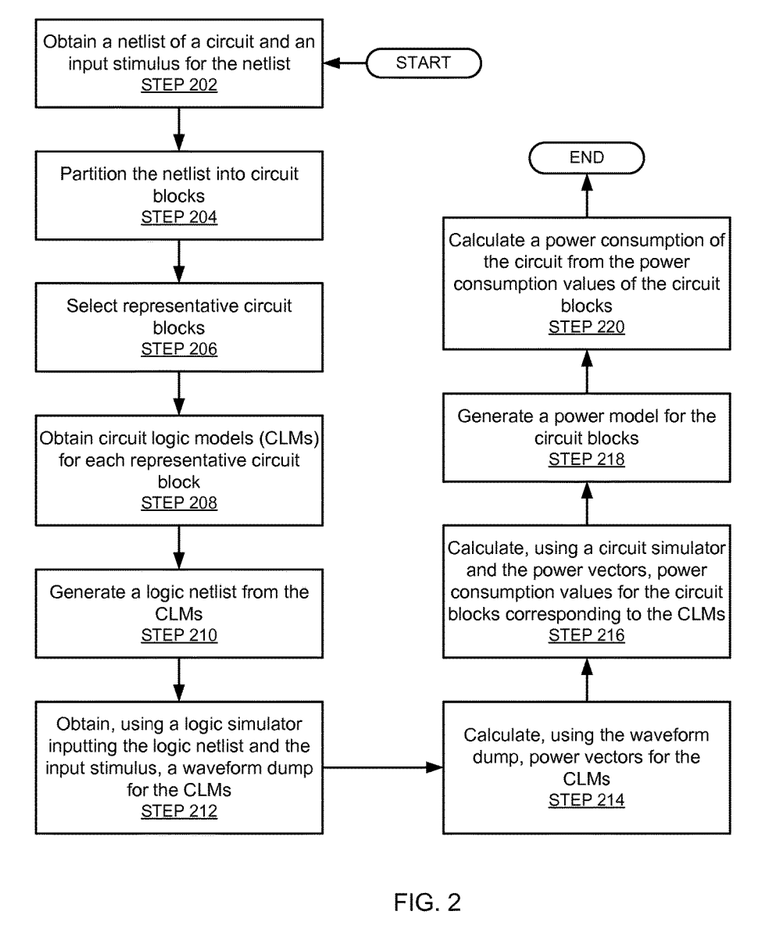
FIG. 2 and FIG. 3 show flowcharts in accordance with one or more embodiments of the invention.

FIG. 2 shows a flowchart for simulating a power consumption associated with a circuit in accordance with one or more embodiments of the invention. The process shown in FIG. 2 may be executed, for example, by one or more components (e.g., circuit partitioner (130), logic simulator (150), circuit simulator (160), logic model generator (140), power roll-up module (170)) discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a netlist and an input stimulus are obtained (Step 202). As discussed above, a netlist may be a representation of a circuit and an input stimulus may include vectors that describe currents and voltages at the interface of the netlist. The netlist and/or the input stimulus may be obtained from a user or automatically (e.g., as part of a software script).

In Step 204, the netlist is partitioned into circuit blocks. As discussed above, circuit partitioning is used as a divide-and-conquer approach for power consumption simulation. The number of circuit blocks (also referred to as circuit blocks) or the range of numbers of devices per circuit block may be chosen automatically or specified by a user. Circuit blocks may take the form of sub-circuit modules connected by a channel, referred to as channel-connected-blocks (CCBs).

In Step 206, representative circuit blocks are chosen from the circuit blocks produced in Step 204. The representative circuit blocks may be unique circuit blocks from those chosen in Step 204 or parameterized circuit blocks that sufficiently represent similar circuit blocks (e.g., blocks with the same or similar topology but potentially different sizes, size-ratios, drive strengths, fan-in, or fan-out values). In one or more embodiments of the invention, Step 206 is skipped and in effect all circuit blocks are representative circuit blocks.

In Step 208, circuit logic models (CLMs) are obtained for each circuit block or each representative circuit block. The CLMs are logic representations of the circuit blocks and may be generated by a system (e.g., logic model generator (140) in FIG. 1) or provided manually by the user. The CLMs may only be obtained for representative circuit blocks and parameterized to represent all other circuit blocks. Those skilled in the art will, having the benefit of this detailed description, will appreciate that many algorithms for generating CLMs exist. One such algorithm is further described below in reference to FIG. 3.

In Step 210, a logic netlist is generated from the CLMs using a logic simulator (e.g., logic simulator (150) in reference to FIG. 1). As discussed above, the logic netlist may be stored in a format such as Verilog, VHDL, and other formats known to those skilled in the art. In one or more embodiments of the invention, the logic netlist is generated directly from the netlist (i.e., the logic netlist is not generated from the circuit blocks and may be generated after Step 204 and before Step 206).

Those skilled in the art will appreciate that only the netlist is necessary for the steps 204-210, and thus steps 204-210 may occur before the input stimulus in step 202 is obtained.

In Step 212, a logic simulation is performed using the logic netlist generated in Step 210 and the input stimulus obtained in Step 202 to generate a waveform dump corresponding to the netlist. A logic simulator (e.g. logic simulator (150) in reference to FIG. 1) propagates switching activity from the inputs to the netlist (input stimulus) to the individual circuit blocks and outputs of the netlist. The waveform dump may describe the time-varying or time-invariant voltages and currents at the interfaces of circuit blocks or at every node in the logic netlist.

In Step 214, a power vector(s) for each CLM are extracted from the waveform dump. In one or more embodiments of the invention, the waveform dump already includes the power vectors (e.g., the waveform dump describes the changes in voltage at the interfaces of circuit blocks and state information within the circuit blocks). In one or more embodiments of the invention, the power vectors also include physical parameters such as temperature, stress vectors, magnetic fields, and other parameters that may affect the power consumption of a circuit block, and some of these parameters may be derived from the waveform dump (e.g., switching activity can be used to predict a temperature change or capacitive/inductive coupling nodes or devices of the circuit block).

In Step 216, using the power vectors generated from Step 214, the power consumption values for each circuit block are calculated using a circuit simulator (e.g., circuit simulator (160) in reference to FIG. 1). In effect, a circuit simulator may simulate the current dissipation from voltage sources, current sources, and energy storage devices and derive the total energy consumed in a finite switching time, arriving at a power consumption value by dividing the energy by the switching time. In one or more embodiments of the invention, the current simulation is parallelized (e.g., it is split up among different threads and/or cores or a microprocessor).

In Step 218, a power model is generated for the circuit blocks. As described above, power consumption value may include a power model for each possible input vector and may be parameterized for different sizes, size-ratios, drive-strengths, fan-in, and/or fan-out of the circuit blocks or representative circuit blocks. For example, the power model may be generated for representative circuit blocks and be modifiable to other circuit blocks (e.g., by scaling the devices).

In Step 220, power consumption values from individual circuit blocks are combined (e.g., summed) to a final power consumption value. The power consumption value of the circuit may be single number (e.g., 10 mW) or may be a power model and may, for example, include a power consumption number for each input vector in the input stimulus or be even further parameterized for different environmental conditions such as a different temperature, chip stress; device parameters such as size and drive strength; and other parameters that may affect power consumption.

Figure 3:
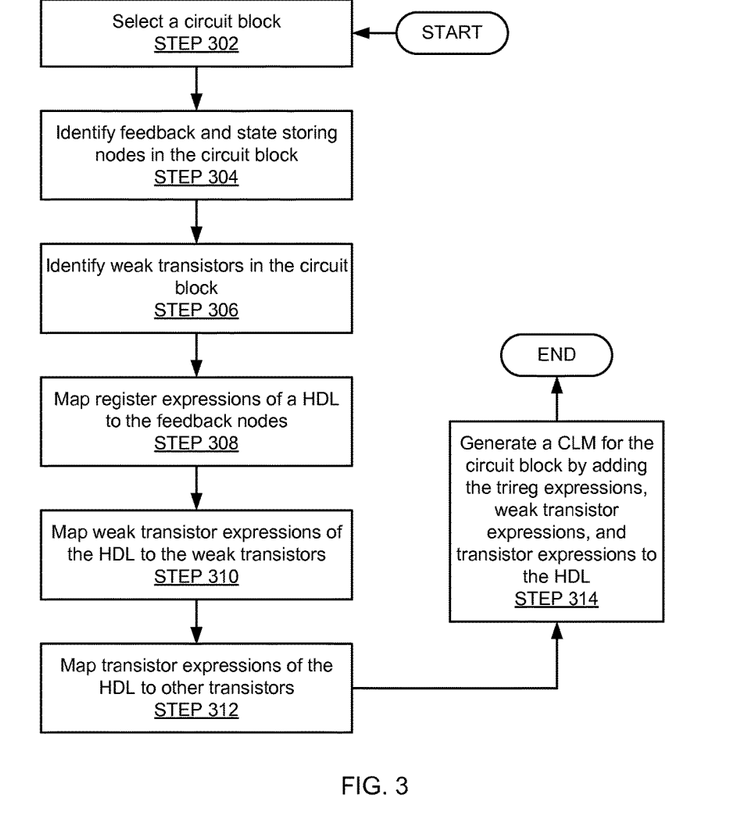

FIG. 3 shows a flowchart for obtaining a CLM corresponding to a circuit block in accordance with one or more embodiments of the invention. The process shown in FIG. 3 may be executed, for example, by one or more components (e.g., logic model generator (140)) discussed above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 3. Moreover, one or more steps in FIG. 3 may correspond to Step 208, discuss above in reference to FIG. 2.

In Step 302, a circuit block is selected. The circuit block may be one of many circuit blocks that are generated as a result of a circuit partitioning process (e.g., the process of Step 204 in reference to FIG. 2). The circuit block may be represented in any suitable format (e.g., a textual representation, a schematic, a layout, and any other representation).

In Step 304, the feedback and state storing nodes of the circuit block are identified. Feedback nodes may be any nodes that connect directly or over a low impedance path to a node that is one or more logic blocks ahead of the given node. In addition, any nodes in between a feedback node the node it connects to may also be considered feedback nodes. State storing nodes may be any nodes that can store a state in the form of a voltage or current. For example, cross coupled inverters, a latch, a flip-flop may contain one or more state storing nodes.

In Step 306, weak transistors are identified in the circuit block. In general, weak transistors are transistors that have a low conductance when they are turned on (i.e., they are in a conducting state). Weak transistors may be identified based on an absolute transistor size (e.g., less than 100 nm in width) or based on a relative transistor size (e.g., 10 times smaller than the median transistor size in a circuit block). Weak transistors may also be identified by other parameters such as transistor type, voltage bias, port connections, and any other methods known to those skilled in the art.

In Step 308, register expressions of an HDL (e.g., Verilog) are mapped to the feedback or state storing nodes identified in Step 304. Those skilled in the art will appreciate that a register expression is used for two nodes that retain a certain value when driven by a high impedance path and switch a value when driven by a low impedance path. For example, if two nodes, node1 and node2, are identified at feedback nodes, the corresponding expression in Verilog may be: "trireg node1, node2;".

In Step 310, weak transistor expressions of an HDL (e.g., Verilog) are mapped to the weak transistors identified in Step 306. Those skilled in the art will appreciate that a rtranif0 expression in Verilog identifies a bi-directional switch that is resistively shorted when a gate value is 0 and an rtranif1 expression in Verilog identifies a bi-directional switch that is resistively shorted when a gate value is 1. For example, a weak NMOS device is represented by corresponding expression in Verilog: "rtranif1 i1 (node1, node2, ctrl_node);". Those skilled in the art, having the benefit of this detailed description, will appreciate that due to the resistive short in rtranxxx expressions (where xxx stands for if0 or if1), the strength of the resulting output may be reduced.

In Step 312, regular transistor expressions of an HDL (e.g., Verilog) are mapped to the regular transistors in the circuit block. Those skilled in the art will appreciate that a tranif0 expression in Verilog identifies a bi-directional switch that is shorted when a gate value is 0 and an tranif1 expression in Verilog identifies a bi-directional switch that is shorted when a gate value is 1. For example, a regular NMOS device is represented by corresponding expression in Verilog: "tranif1 i1(node1, node2, ctrl_node);", whereas a regular PMOS device is represented by corresponding expression in Verilog: "tranif0 i1(node1, node2, ctrl_node);".

In Step 314, the CLM is generated by putting together the register expressions, weak transistor expressions, and transistor expressions together into one file. In this step other supporting expression may be added, such as headers (e.g., module identifiers in Verilog, input and output lists), footers (e.g., endmodule in Verilog), and voltage/current supplies (e.g., the power supply and ground statements). In one or more embodiment of the invention, the CLM may be tested (e.g., compiled, checked for errors) to make sure that it is a valid logic model.

Figure 4:
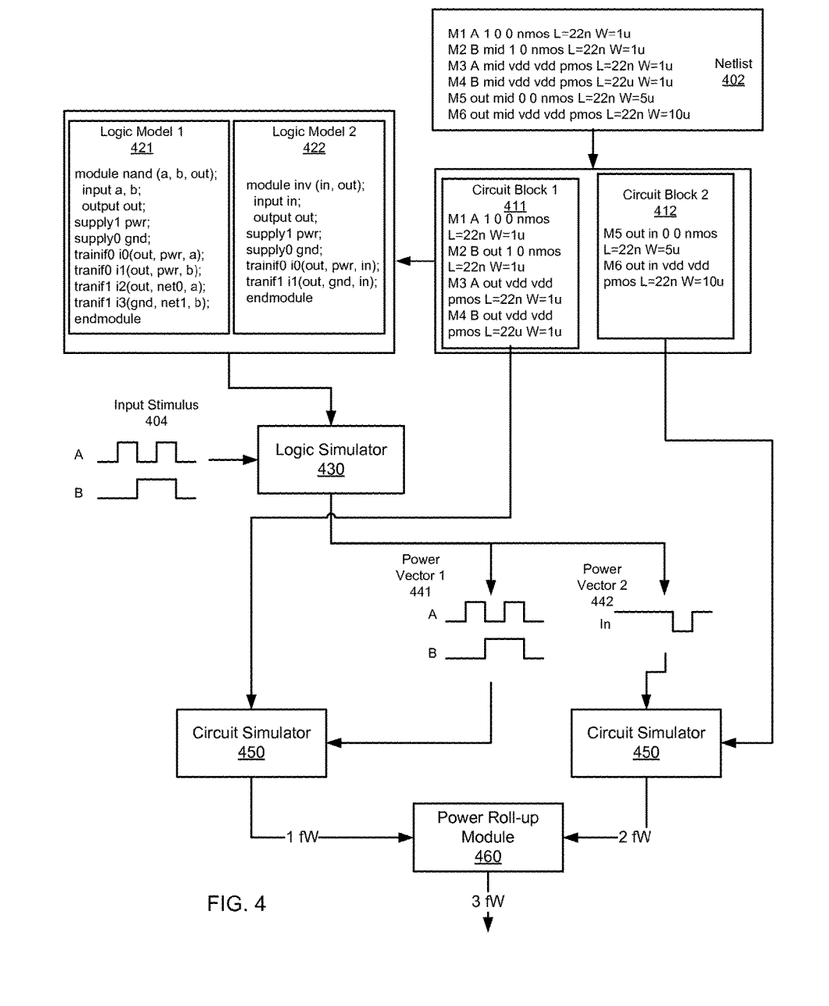
FIG. 4 shows an example in accordance with one or more embodiments of the invention.

FIG. 4 shows an example in accordance with one or more embodiments of the invention. The example shown in FIG. 4 may be generated using the power consumption simulator (110), discussed above in reference to FIG. 1, and the processes described in FIG. 2 and FIG. 3. Those skilled in the art, having the benefit of this detailed description, will appreciate that the sample netlists, logic netlists, and input stimuli in FIG. 4 only examples.

Initially, a netlist (402) is obtained. In this example, the netlist (402) is a SPICE netlist of a NAND gate followed by an inverter, though it may not immediately obvious from the netlist (402). Those skilled in the art will appreciate that the SPICE netlist (402), as in this example, contains detailed information about the devices (e.g., device sizes) that generally are not included in logic netlists.

Next, the netlist (402) is partitioned (e.g., using circuit partitioner (130) in reference to FIG. 1) into two circuit blocks (i.e., circuit block 1 (411) and circuit block 2 (412)). In this example, the circuit blocks (i.e., circuit block 1 (411) and circuit block 2 (412)) are partitioned into the respective NAND gate in circuit block 1 (411) and the inverter in circuit block 2 (412). Although device details, such as size and topology, do not change in the partitioning process, the node names may change (e.g., the mid node in the netlist (402) becomes the out node in circuit block 1 (411) and the in node in circuit block 2 (412)), in accordance with one or more embodiments of the invention.

After generating the circuit blocks (i.e., circuit block 1 (411) and circuit block 2 (412)), logic models (i.e., logic model 1 (421) and logic model 2 (422)) are generated (e.g., by a logic model generator (140) in reference to FIG. 1). In this example, the logic models (i.e., logic model 1 (421) and logic model 2 (422)) are written in Verilog. Logic model 1 (421) corresponds to circuit block 1 (411) and represents a NAND gate whereas logic model 2 (422) corresponds to circuit block 2 (412) and represents and inverter. The logic models (i.e., logic model 1 (421) and logic model 2 (422)) may contain a simpler representation of the circuit blocks (e.g., they may not include device sizes).

As a next step, a logic models (i.e., logic model 1 (421) and logic model 2 (422)) are inputted into a logic simulator (430) along with an input stimulus (404) that may be chosen by a user. The input stimulus in this case shows a voltage level over time of the inputs to the netlist (402), specifically to nodes labeled A and B. The logic simulator performs a logic simulation on the logic models (i.e., logic model 1 (421) and logic model 2 (422)) using the input stimulus (404) to obtain two power vectors (i.e., power vector 1 (441) and power vector 2 (442)) for the circuit blocks (i.e., circuit block 1 (411) and circuit block 2 (412)). As in the case of the input stimulus (404), the power vectors (i.e., power vector 1 (441) and power vector 2 (442)) are voltage values over time. Power vector 1 (441) is the same as the input stimulus (404) since nodes A and B of logic model 1 (421) are also input nodes of the netlist (402). Those skilled in the art will appreciate that power vector 2 (442) corresponds to an output of a NAND gate (i.e., logic model 1 (421)) when given the power vector 1 (441) as input, as expected.

After the power vectors are obtained, the next step is to perform a circuit simulation on the circuit blocks (i.e., circuit block 1 (411) and circuit block 2 (412)) using the power vectors (i.e., power vector 1 (441) and power vector 2 (442)). A circuit simulator (450) performs a circuit simulation for each pair of circuit blocks and corresponding power vectors and obtains a power consumption value (e.g., 1 fW for circuit block 1 (411) using power vector 1 (441) and 2 fW for circuit block 2 (412) using power vector 2 (442)). Those skilled in the art, having the benefit of this detailed description, will appreciate that a particular circuit block may have more than one power vector associated with it.

As a final step, a power roll-up module (460) adds the two power consumption values from the two circuit block/power vector pairs together to obtain 1 fW+2 fW=3 fW. This final power consumption value now corresponds to the power consumption value of the netlist (402) when stimulated with input stimulus (404). As discussed above, the power consumption value may instead be kept in a table for each circuit block to serve as a power model for the circuit.

Figure 5:
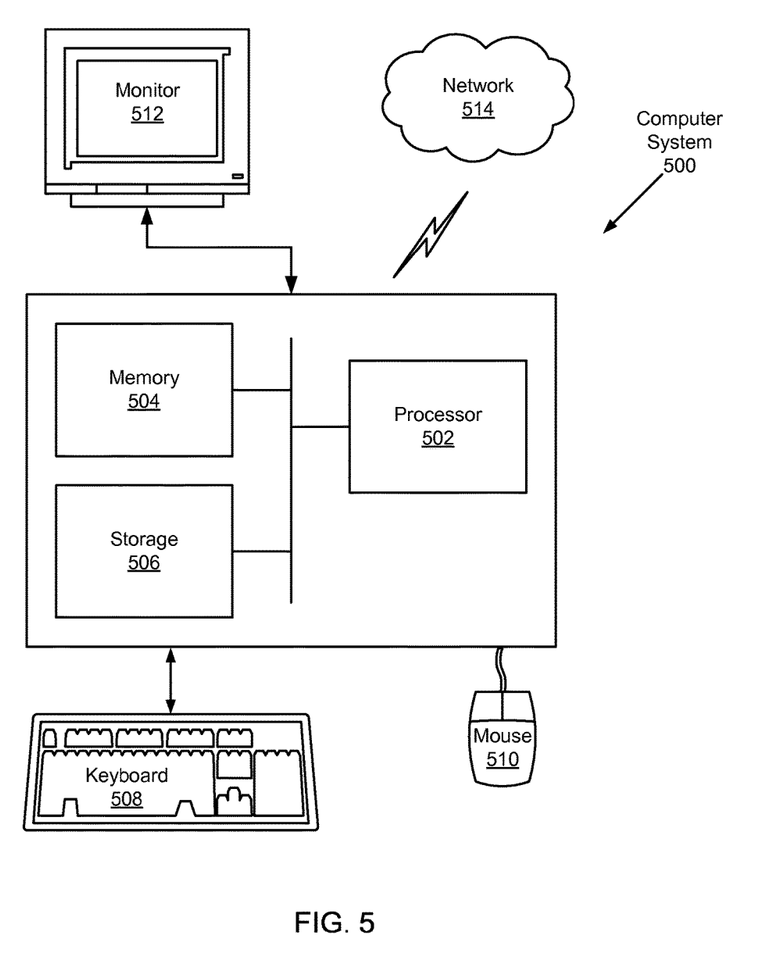
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processors (502), associated memory (504) (e.g., random access memory (RAM), cache memory, flash memory, etc.), a storage device (506) (e.g., a hard disk, an optical drive such as a compact disc (CD) drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention. In one or more embodiments, the circuit partitioner (130), the logic model generator (140), the logic simulator (150), the circuit simulator (160), and the power roll-up module (170) execute on at least one of the processors (502).

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a digital video disc (DVD), flash memory stick, a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for simulating a power consumption associated with a circuit, comprising:
   obtaining a netlist describing the circuit and an input stimulus for the netlist;
   partitioning the netlist into a plurality of circuit blocks comprising a first circuit block and a second circuit block;

obtaining a plurality of circuit logic models (CLMs) implemented in a hardware description language (HDL), the plurality of CLMs comprising a first CLM corresponding to the first circuit block and a second CLM corresponding to the second circuit block;

generating a logic netlist from the plurality of CLMs implemented in the HDL;

calculating, using a logic simulator executing on a computer processor inputting the logic netlist and the input stimulus, a first power vector for the first CLM corresponding to the first circuit block;

calculating a first power consumption value for the first circuit block by simulating, using a circuit simulator executing on the computer processor, current dissipation in the first circuit block when the first power vector is applied to the first circuit block, wherein the first circuit block specifies transistor geometry that affects simulation of the first circuit block by the circuit simulator; and calculating the power consumption associated with the circuit based on and after calculating the first power consumption value.

2. The method of claim 1, wherein partitioning the netlist comprises:
converting the netlist into a channel-connected block (CCB) representation.

3. The method of claim 2, wherein obtaining the plurality of CLMs comprises:
identifying a feedback node in the first circuit block;
identifying a weak transistor in the first circuit block based on a transistor size; and
generating the first CLM for the first circuit block by adding a plurality of expressions in the HDL corresponding to the feedback node and the weak transistor.

4. The method of claim 1, further comprising:
calculating, by the circuit simulator, power consumed by the first circuit block for the first power vector; and
creating a power model for the first circuit block including the first power consumption value based on the power consumed by the first circuit block.

5. The method of claim 1, further comprising:
calculating, using the logic simulator inputting the logic netlist and the input stimulus, a second power vector for the second CLM based on an output of the first CLM after propagating switching activity of the input stimulus to the output of the first CLM; and
calculating a second power consumption value for the second circuit block by simulating, using the circuit simulator, current dissipation in the second circuit block when the second power vector is applied to the second circuit block,
wherein calculating the power consumption associated with the circuit comprises summing the first power consumption value and the second power consumption value corresponding to the second circuit block.

6. The method of claim 5, wherein the first power vector comprises a stress vector that affects power consumption of the first circuit block, wherein the circuit simulator is a SPICE simulator, and wherein the logic simulator is a VERILOG simulator.

7. A system for simulating a power consumption associated with a circuit, comprising:
a computer processor;
a circuit partitioner executing on the computer processor and configured to:
obtain a netlist describing the circuit; and
partition the netlist into a plurality of circuit blocks comprising a first circuit block and a second circuit block;
a logic model generator executing on the computer processor and configured to:
obtain a plurality of circuit logic models (CLMs) implemented in a hardware description language (HDL) for the plurality of circuit blocks, the plurality of CLMs comprising a first CLM corresponding to the first circuit block and a second CLM corresponding to the second CLM; and
generate a logic netlist from the plurality of CLMs implemented in the HDL;
a logic simulator executing on the computer processor and configured to:
obtain an input stimulus for the netlist; and
calculate, using the logic netlist and the input stimulus, a first power vector for the first CLM corresponding to the first circuit block of the plurality of circuit blocks;
a circuit simulator executing on the computer processor and configured to:
input the first power vector;
calculate a first power consumption value for the first circuit block by simulating current dissipation in the first circuit block when the first power vector is applied to the first circuit block,
wherein the first circuit block specifies transistor geometry that affects simulation of the first circuit block by the circuit simulator; and
a power roll-up module executing on the computer processor and configured to:
calculate the power consumption associated with the circuit based on and after calculating the first power consumption value.

8. The system of claim 7, wherein the circuit partitioner executing on the computer processor is further configured to:
convert the netlist into a channel-connected-block (CCB) representation.

9. The system of claim 7, wherein the logic model generator executing on the computer processor is further configure to:
identify a feedback node in the first circuit block;
identify a weak transistor in the first circuit block based on a transistor size; and
generate the first CLM for the first circuit block by adding a plurality of expressions in the HDL corresponding to the feedback node and the weak transistor.

10. The system of claim 7, wherein the circuit simulator executing on the computer processor is further configured to:
calculate power consumed by the first circuit block for the power vector; and
create a power model for the first circuit block including the first power consumption value based on the power consumed by the first circuit block.

11. The system of claim 7, wherein:
the logic simulator is further configured to calculate a second power vector for the second CLM based on an output of the first CLM after propagating switching activity of the input stimulus to the output of the first CLM; and
the circuit simulator is further configured to calculate a second power consumption value for the second circuit block by simulating current dissipation in the second circuit block when the second power vector is applied to the second circuit block; and the power roll-up module executing on the computer processor is further configured to calculate the power consumption of the circuit by summing the first power consumption value and the second power consumption value corresponding to the second circuit block.

12. The system of claim 11, wherein the first power vector comprises a stress vector that affects power consumption of the first circuit block, wherein the circuit simulator executing on the computer processor is a SPICE simulator, and wherein the logic simulator executing on the computer processor is a VERILOG simulator.

13. A non-transitory computer readable medium (CRM) storing instructions for simulating a power consumption associated with a circuit, the instructions comprising functionality for:

obtaining a netlist describing the circuit and an input stimulus for the netlist;

partitioning the netlist into a plurality of circuit blocks comprising a first circuit block and a second circuit block;

obtaining a plurality of circuit logic models (CLMs) implemented in a hardware description language (HDL), the plurality of CLMs comprising a first CLM corresponding to the first circuit block and a second CLM corresponding to the second circuit block;

generating a logic netlist from the plurality of CLMs implemented in the HDL;

calculating, using a logic simulator inputting the logic netlist and the input stimulus, a first power vector for the first CLM corresponding to the first circuit block;

calculating a first power consumption value for the first circuit block by simulating, using a circuit simulator, current dissipation in the first circuit block when the first power vector is applied to the first circuit block, wherein the first circuit block specifies transistor geometry that affects simulation of the first circuit block by the circuit simulator; and calculating the power consumption associated with the circuit based on and after calculating the first power consumption value.

14. The non-transitory CRM of claim 13, wherein the instructions for partitioning the netlist comprise functionality for:

converting the netlist into a channel-connected block (CCB) representation.

15. The non-transitory CRM of claim 14, wherein the instructions for obtaining the plurality of CLMs comprise functionality for:

identifying a feedback node in the first circuit block;

identify a weak transistor in the first circuit block based on a transistor size; and generating the first CLM for the first circuit block by adding a plurality of expressions in the HDL corresponding to the feedback node and the weak transistor.

16. The non-transitory CRM of claim 13, the instructions further comprising functionality for:

calculating, by the circuit simulator, power consumed by the first circuit block for the first power vector; and creating a power model for the first circuit block including the first power consumption value based on the power consumed by the first circuit block.

17. The non-transitory CRM of claim 13, the instructions further comprising functionality for:

calculating, using the logic simulator inputting the logic netlist and the input stimulus, a second power vector for the second CLM based on an output of the first CLM after propagating switching activity of the input stimulus to the output of the first CLM; and calculating a second power consumption value for the second circuit block by simulating, using the circuit simulator, current dissipation in the second circuit block when the second power vector is applied to the second circuit block, wherein calculating the power consumption associated with the circuit comprises summing the first power consumption value and the second power consumption value corresponding to the second circuit block, wherein the first power vector comprises a stress vector that affects power consumption of the first circuit block, wherein the circuit simulator is a SPICE simulator, and wherein the logic simulator is a VERILOG simulator.

18. The method of claim 4, further comprising:

selecting the first circuit block as a representative of a third circuit block in the plurality of circuit blocks; and generating a power model for the third circuit block by modifying the power model for the first block, wherein the first circuit block and the third circuit block differ in a parameter selected from a group consisting of device size, drive strength, fan-in, and fan-out, and wherein the power consumption associated with the circuit is further based on the power model for the third circuit.

19. The system of claim 10, wherein:

the circuit partitioner selects the first circuit block as a representative of the third circuit block;

the power roll-up module generates a power model for the third circuit block by modifying the power model for the first block;

the first circuit block and the third circuit block differ in a parameter selected from a group consisting of device size, drive strength, fan-in, and fan-out; and the power consumption associated with the circuit is further based on the power model for the third circuit.

20. The non-transitory CRM of claim 16, further comprising:

selecting the first circuit block as a representative of a third circuit block in the plurality of circuit blocks; and generating a power model for the third circuit block by modifying the power model for the first block, wherein the first circuit block and the third circuit block differ in a parameter selected from a group consisting of device size, drive strength, fan-in, and fan-out, and wherein the power consumption associated with the circuit is further based on the power model for the third circuit.

* * * * *